Figure 1:
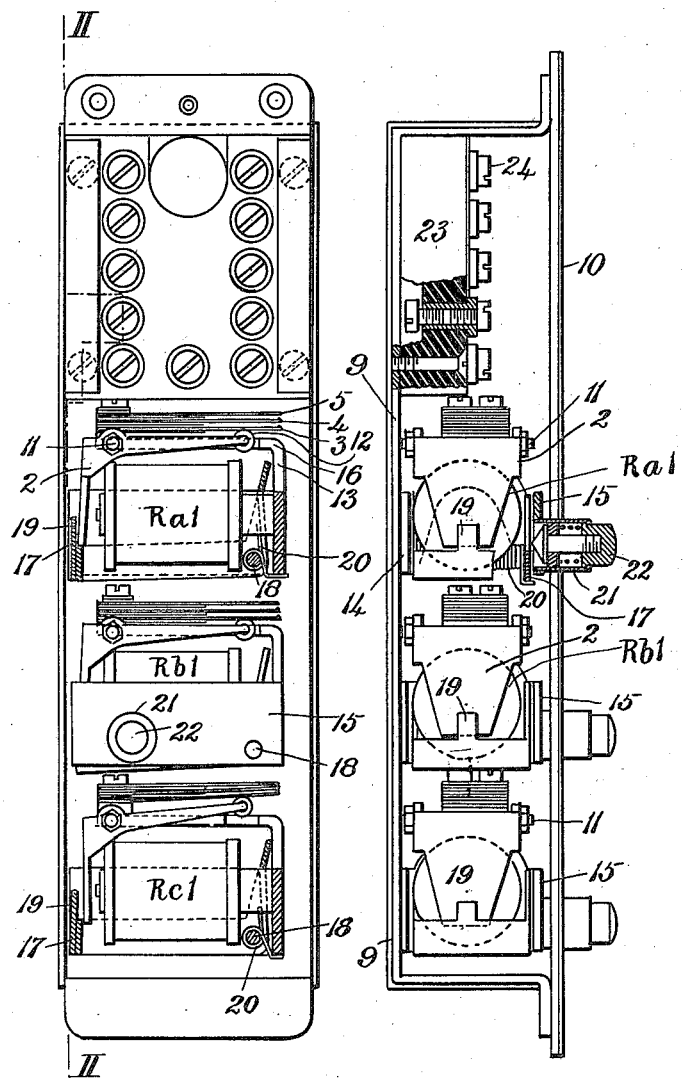

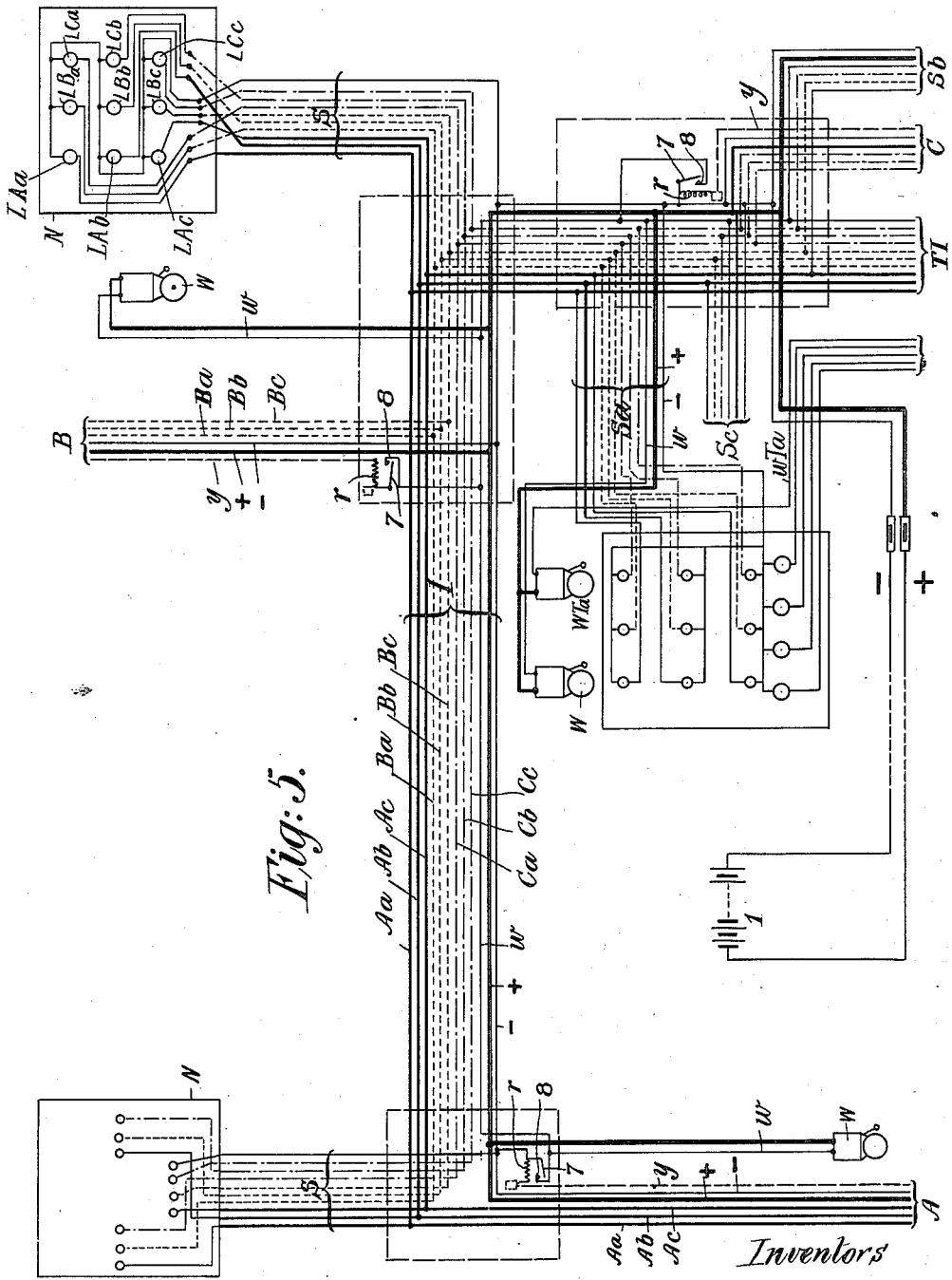

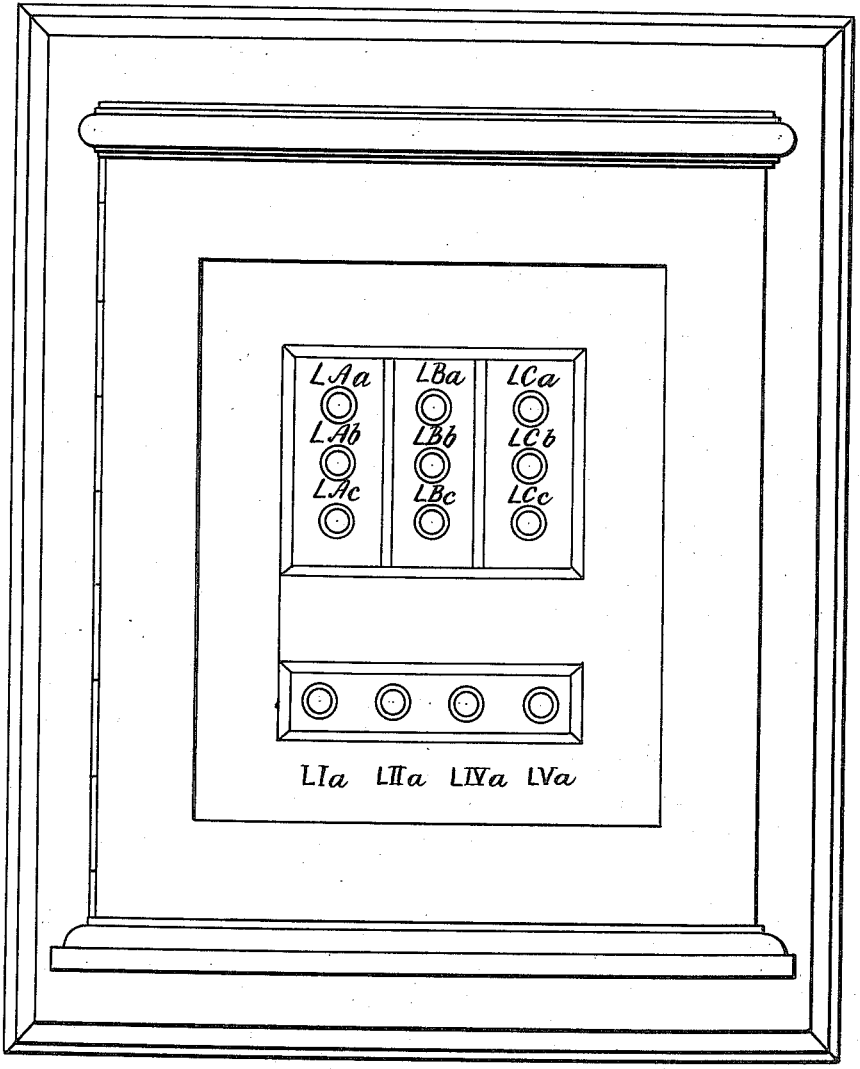

F. BRINKMANN & F. G. BELL.
ATTENDANT'S SIGNALING SYSTEM.
APPLICATION FILED JULY 31, 1914.
1,189,657.
Patented July 4, 1916.
10 SHEETS—SHEET 7.
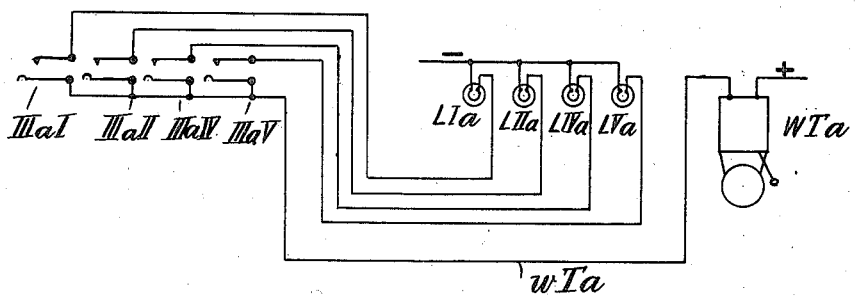
Fig: 7.

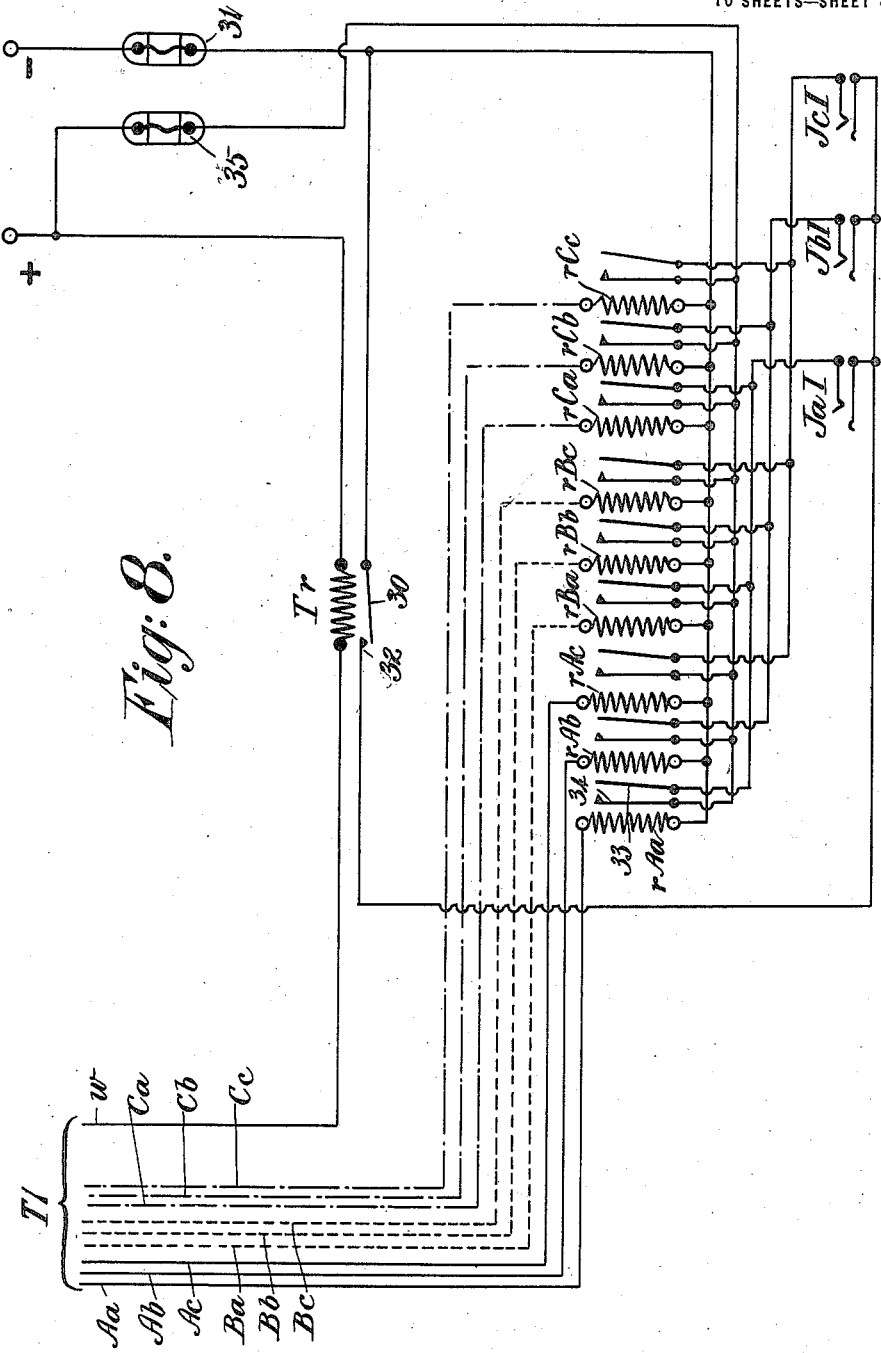

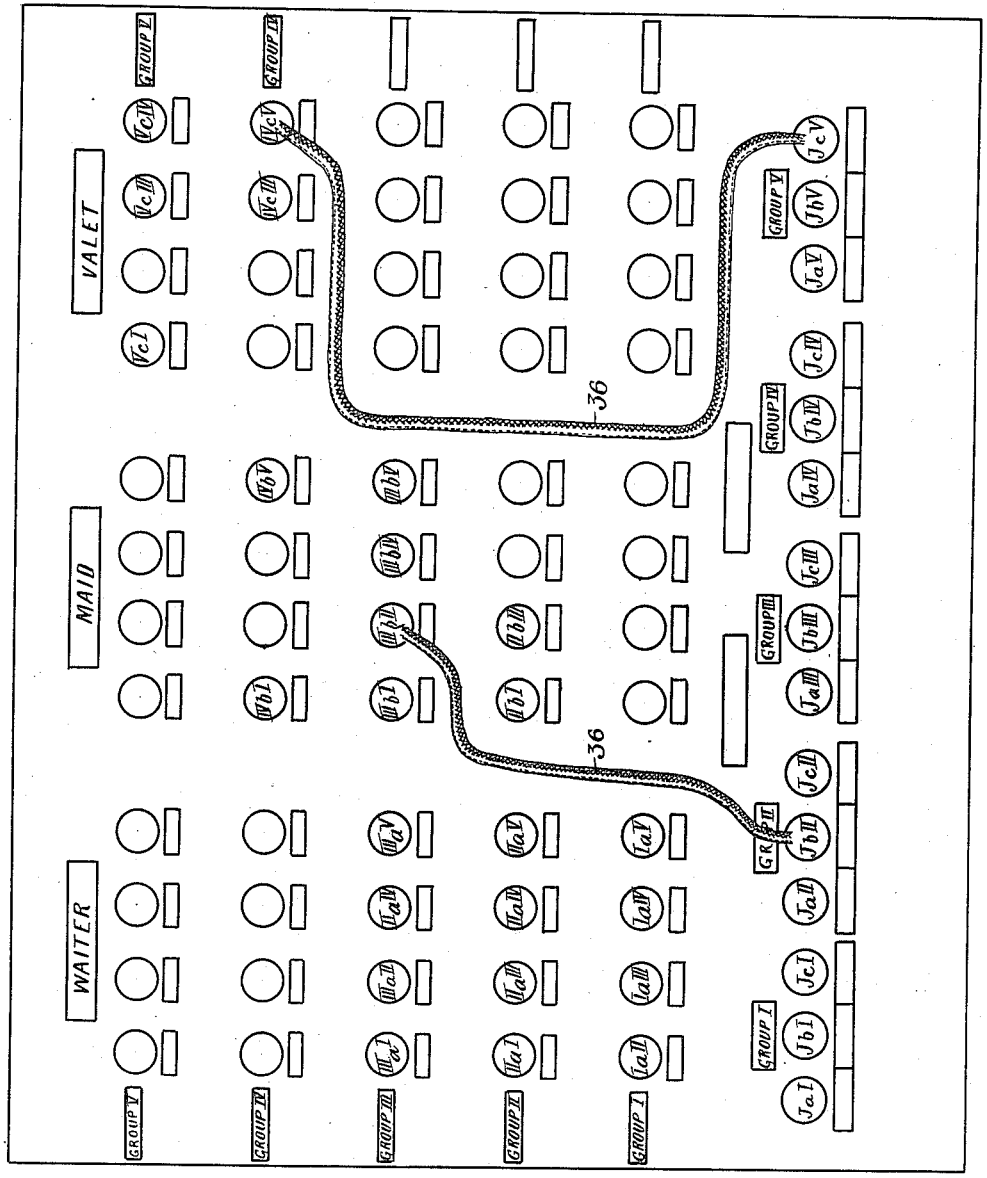

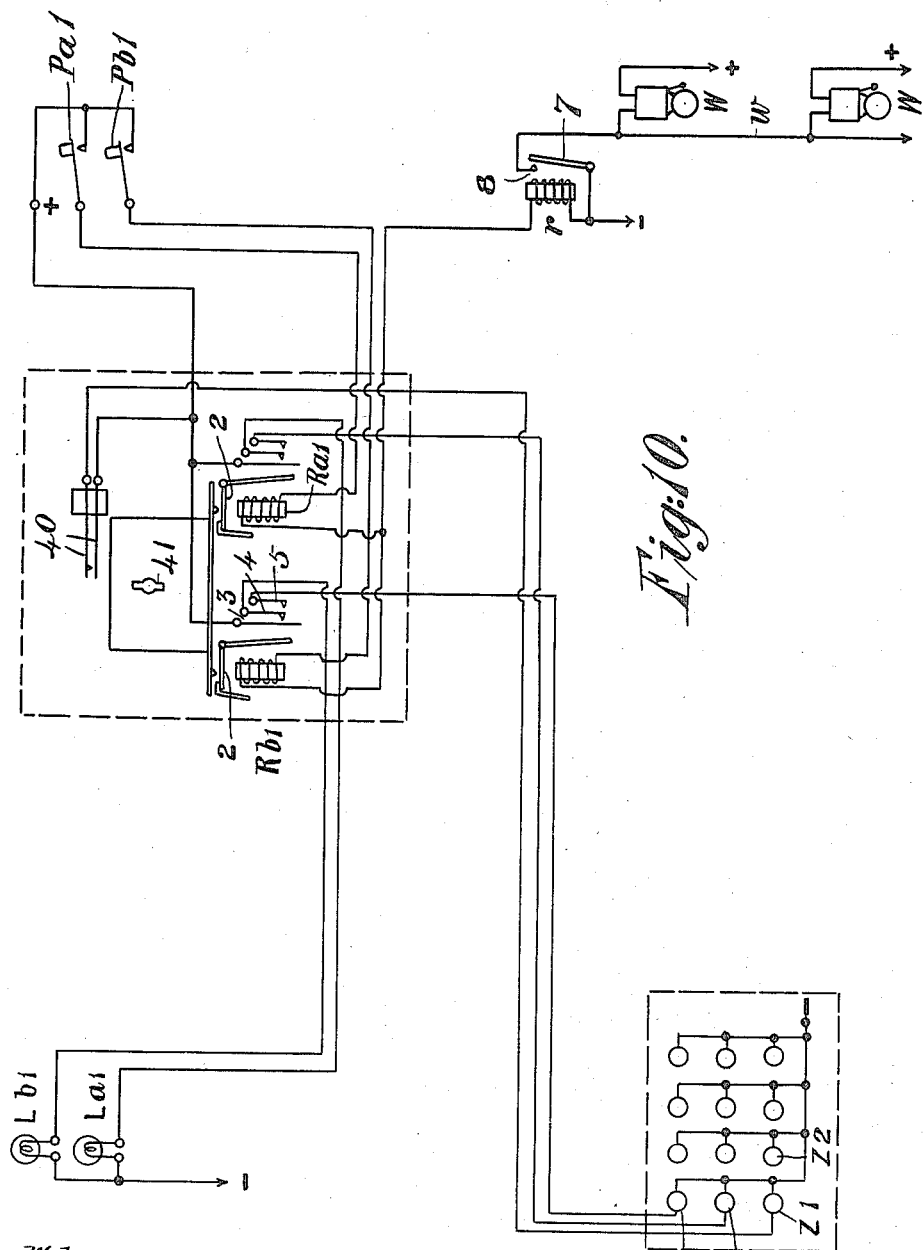

UNITED STATES PATENT OFFICE.

FREDERICK BRINKMANN, OF HANOVER, GERMANY, AND FRANCIS GEORGE BELL, OF LONDON, ENGLAND.

ATTENDANT'S SIGNALING SYSTEM.

1,189,657.  Specification of Letters Patent.  Patented July 4, 1916.

Application filed July 31, 1914. Serial No. 854,420.

*To all whom it may concern:*

Be it known that we, FREDERICK BRINKMANN, a subject of the Emperor of Germany, residing at 18 Kniestrasse, Hanover, in the Empire of Germany, and FRANCIS GEORGE BELL, a subject of the King of Great Britain, residing at 210–212 Tottenham Court road, London, W., England, have invented new and useful Improvements in Attendants' Signaling Systems, of which the following is a specification.

Our invention relates to signaling apparatus for calling attendants. Its purpose is to provide a complete, convenient, and flexible system by which a number of groups of stations may command the services of a staff of attendants of different classes assigned to the several groups; and by which the distribution of services among the staff may be from time to time varied at will.

In particular our invention relates to signaling systems for large hotels and like institutions, by the aid of which a number of stations represented by separate rooms or suites, and divided into groups, for instance the several floors of the hotel, may signal for different classes of attendants, as waiters, maids and valets, in a staff assigned to the particular floor, and whereby a responsible person may at convenient times assign any particular class of servants of any particular staff to attend upon any particular floor or group of stations in addition to that normally attended by that staff.

In order to secure completeness and convenience in the signaling system our invention designs to provide every station with calling devices by which in addition to an audible signal common to the group of stations visual signals may be actuated adjacent to the station and at suitably placed remote indicators, and with devices by which an attendant answering a call may restore all the signals resulting from that call. We prefer, too, that a group of stations should be divided into sections, in which case we provide for each station giving signals distinctive of its section at the remote indicators. And where there is more than one class of attendants, we make at least the visual signals distinctive of the class of attendants called. To achieve these ends we cause the signals to be actuated by the armature of a relay excited by operation of the calling device, and we arrange that the armature of such relay shall be mechanically retained, so as to maintain the visual signals, until mechanically released by an attendant responding to the call.

By way of example the invention will be described with reference to a system of signaling for a large hotel in which there are several separate floors or other groups of stations, i. e. of rooms each served by a staff of attendants of three classes, viz. waiters, maids and valets. But while reference may be made to this conception to give definiteness and concreteness to the functions described, it will be understood from the general terms employed that the system is applicable in many other situations, for instance in large offices where substantially similar requirements exist.

Figure 2:
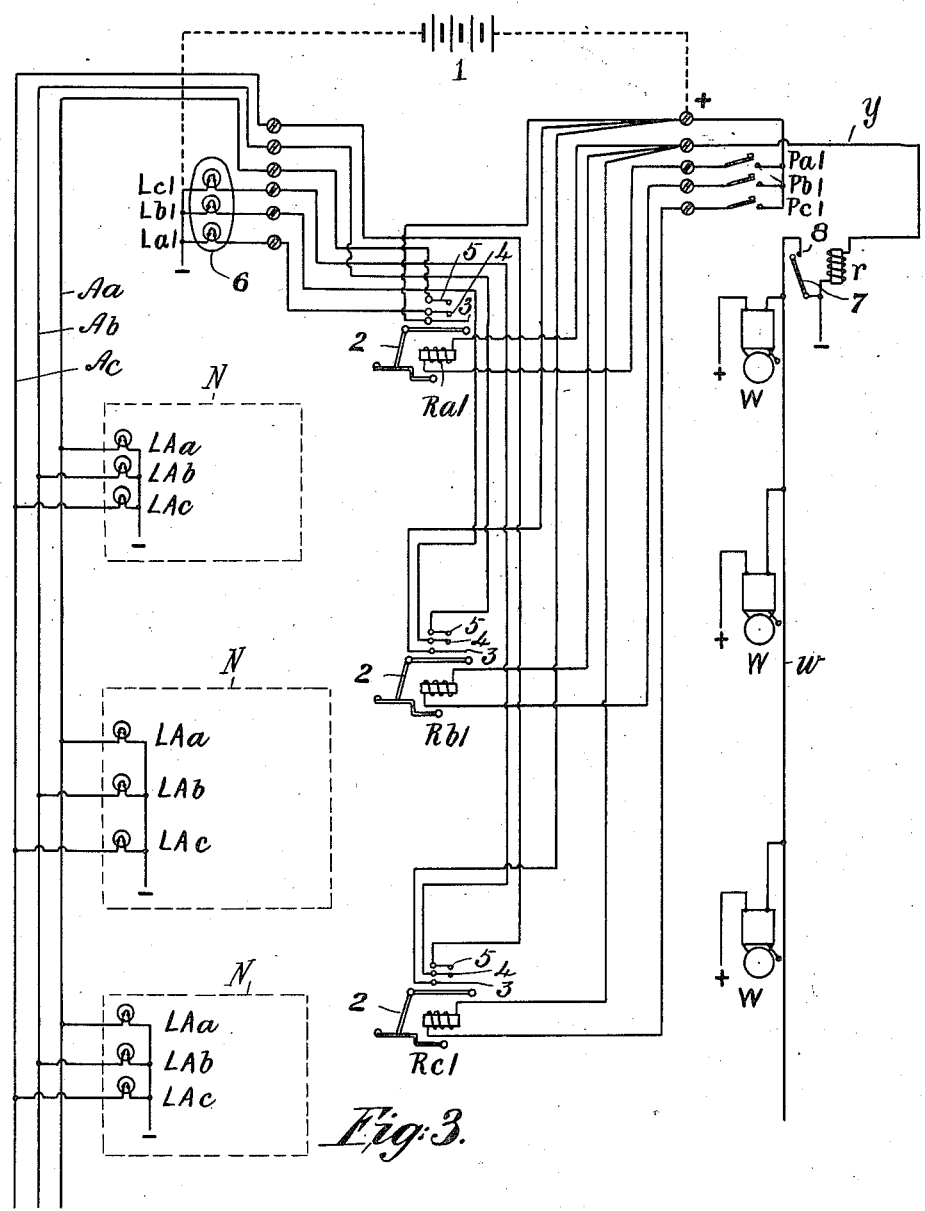
Figure 3:
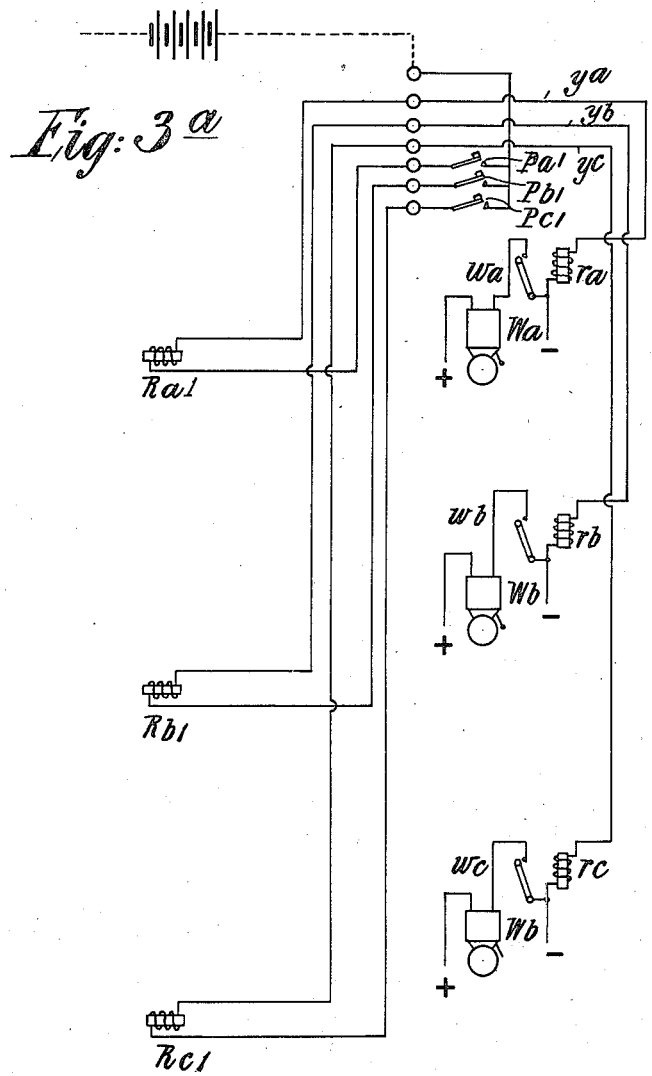
Figure 4:
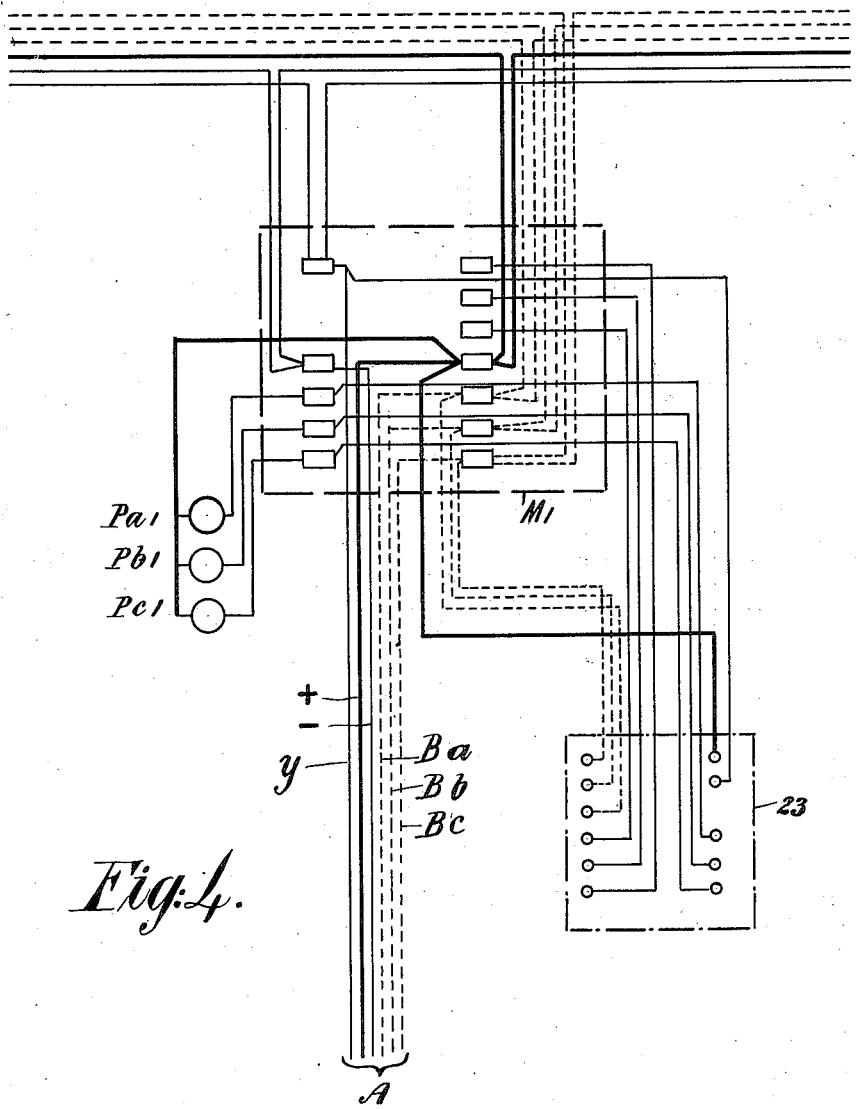

In the accompanying drawings—Figure 1 is an elevation with the front plate removed of a contact-making apparatus provided at each station for the actuation of the several signals together with a restoring device therefor; Fig. 2 is a cross section of this apparatus on the line II—II of Fig. 1; Fig. 3 is a diagram of the connections at each station and of the signals operated from it; Fig. 3ª is a diagram of connections at each station of a slightly modified arrangement; Fig. 4 is a diagram of the wiring at a station, and Fig. 5 is a partial diagram of the wiring of the whole of the group of stations: Fig. 6 shows a servant's indicator; Fig. 7 shows a part of the electrical connections for such an indicator; Fig. 8 shows the connections by which calls are carried to a transfer board at which they can be transferred to another group; Fig. 9 shows the transfer board; and Fig. 10 shows a modification of the apparatus.

The apparatus shown in Figs. 1–3 is designed to give at the station and at any desired number of indicators visual signals indicative of three classes of attendants and simultaneously to actuate one or more audible signals common to the whole group and to all classes of attendants.

The calling apparatus comprises three simple press buttons P$a$1, P$b$1, P$c$1 arranged within the room, say room (1). One pole of each of these press buttons is joined to one pole, say the positive, of any suitable source of electrical power indicated at 1. To the other pole of each button is joined the winding of a corresponding electromagnet R$a$1, R$b$1, R$c$1. The armature 2 of each electromagnet when attracted presses into contact three contact springs 3, 4, 5, the lowermost of which serves as a return spring tending to press back the armature to its unattracted position. This lowermost spring is joined to the positive pole of the source and the spring next it is joined to one terminal of a signal lamp L$a$1, L$b$1, L$c$1 respectively, the other terminals of which are joined to the negative pole of the source. The three signal lamps have bulbs of different colors and are conveniently arranged outside the room above its door within a common ornamental globe 6. Each uppermost contact spring 5 is joined to a line A$a$, A$b$, A$c$, running throughout the group to which the station belongs, say section (A) and at several section indicators conveniently disposed the respective lines are joined each to one terminal of a visual indicator, for example a lamp LA$a$, LA$b$, LA$c$ respectively, the opposite terminals of which are joined to the negative pole of the source. The remaining terminals of the windings of relays R$a$1, R$b$1, R$c$1 are all joined through the winding of a relay $r$ conveniently located, say in a junction box, in the section with the negative pole of the source of supply. The armature 7 of the relay $r$ is connected to the negative pole of the source and when attracted abuts upon a contact 8 joined to a line $w$ running throughout the group. To this line are connected at intervals in convenient positions audible signaling devices as bells W, the remaining terminals of which are joined to the positive pole of the source.

The mechanical construction of the relays R$a$1, R$b$1, R$c$1 is seen in Figs. 1 and 2. Each is screwed upon the end 13 of an inclosing member which has side portions 14, 15 and a top portion 16 extending along respectively beside and above the relay. The side portion 14 is screwed upon a common back plate 9 which is bent at right angles at its ends to form the top and bottom of a casing upon which is screwed a face plate 10. The L-shaped armature 2 of each electromagnet is pivoted at 11 upon the top portion 16 of its inclosing member, and at one end carries an insulating roller 12 in position to bear upon the springs 3, 4, 5. In the side portions 14, 15 of the member inclosing the solenoid there is pivoted at 18 a locking frame 17, comprising a U-shaped strip of metal pivoted at the ends of its free arms which are joined by a loop extending upwardly and passing over the core of the solenoid. At its opposite end the strip 17 has an upstanding tongue 19 of less thickness than itself which normally engages over the end of the armature 2, while the thicker portion of the strip 17 abuts upon the edge of the armature. This is best seen in the electro-magnet structures R$a$1 and R$c$1 of Fig. 1 which are illustrated as though the parts 15 were removed. The locking frame is normally pressed upward by a spring 20 surrounding its pivot 18. When the armature is attracted as is shown for the electro-magnet R$c$1 in Fig. 1 the locking frame rises so that its thicker portion engages over the armature and prevents it from receding. The loop of the frame limits this upward movement.

For restoring the signaling devices there are mounted in bosses 21 formed upon the parts 15 simple spring-pressed buttons 22, the inner ends of which are beveled as seen for the top press button in Fig. 2. When pressed inward this beveled end engages against the side of the locking frame 17 so depressing it and thus releasing the armature if previously it was locked in attracted position. The respective press buttons may conveniently be colored to correspond with the corresponding lamps L$a$1, L$b$1, L$c$1, and they may have opposite them an indication denoting the class of servant to which they are appropriated. The front plate may also bear the number of the station.

For convenience in wiring there is mounted upon the back plate 9 above the electromagnets a terminal board comprising an insulating block 23 and terminal screws 24 which substantially correspond with those indicated in Fig. 3.

If desired in place of the arrangement shown in Figs. 1 and 2 the construction of relay described in British application No. 16418 of 1914 may be adopted. This has the advantage that the press button itself forms an indicator, so that should the lamp signal at the station fail it will yet be possible to tell from the press buttons which station has called.

As is indicated on Fig. 4 the connections to each station are made by means of a six-wire cable. This comprises conductors joined to the positive and negative poles of the source and marked $+$ and $-$ respectively, a wire for the audible signals extending to the nearest relay $r$ and three wires say B$a$, B$b$, B$c$ for three visual signals distinctive of three classes of servants. This cable is brought to a terminal board at the station, of which only the separate terminals are shown, the outline of the board being indicated by the broken line M1. From this board a four-wire cable leads to the press buttons P$a$1, P$b$1, P$c$1 arranged inside the room, and an eleven-wire cable leads to the terminal block 23 of the connecting apparatus which is arranged just outside the door of the room. It will be noted that the six-wire cable extends onward to other rooms, in fact passing to every room belonging to section A.

Fig. 5 indicates what part the wiring of

Fig. 4 forms of the whole wiring of the group. The six-wire cable marked A which passes to all the rooms of section A and at each room is connected as indicated in Fig. 4, is tapped off from a main cable I comprising twelve wires. This cable is intended to feed three sections, and the wires it comprises are first + and − wires from the source of supply, a wire $w$ for audible signals, the three wires $Aa$, $Ab$, $Ac$ of section A and two other sets each of three wires $Ba$, $Bb$, $Bc$, and $Ca$, $Cb$, $Cc$. For the sake of distinction the wires of section A are shown continuous, those of section B dotted, and those of section C as dot-dash lines. From this main cable, therefore, there are tapped off two other six-wire cables besides cable A, viz. cable B and cable C.

At intervals there are tapped off from the main cable I branch ten-wire cables S, each of which proceeds to a section indicator. One such indicator is shown at N in Fig. 5 and it will be noted comprises visual signals, for example lamps $LAa$, $LAb$, $LAc$, $LBa$, $LBb$, $LBc$, and $LCa$, $LCb$, $LCc$. These visual signals are therefore respectively distinctive both of a class of servants and of a particular section of the group. There are also tapped off at intervals from the main cable I two-wire cables each proceeding to a bell W.

For the sake of clearness it may be noted that in the composite references used in this specification the final number, for instance the "1" in $Pa1$, may be regarded as distinctive of a particular station; the small letter, for instance $a$ in $Pa1$ or in $LAa$, signifies a class of attendant; the capital letters A, B and C signify sections of a group, and the roman numerals, for instance I, are distinctive of the group as a whole.

Signaling within the group comprises the following operations: Supposing that the station indicated by 1 in the compound references, belonging to the section indicated by A, in the group of stations signified by I, desires to call an attendant of the class indicated by $b$, that is for instance room (1) in section (A) on floor (I) desires to call a maid, the signal is given by depression of the push $Pb1$. This completes a circuit from the positive pole of the source 1 through the winding of electromagnet $Rb1$, through the relay $r$ to the negative pole of the source. The immediate result of this is the attraction of armatures 2 and 7. Dealing with the latter first, it will be obvious from Fig. 3 that its sole effect is to complete a circuit from the positive pole of the source, through bells $w$ in parallel, contact 8, armature 7 to the negative pole of the source. The bells W are therefore rung; and their circuit is interrupted immediately the push $Pb1$ is released owing to the release of armature 7. Armature 2, on the other hand, is not released when the push $Pb1$ is let go, for on attraction it is engaged by the locking device 17 and therefore remains in the position indicated in the lowermost electromagnet of Fig. 1. The insulating roller 12 has pressed the springs 3, 4, 5 into contact. As the result the following circuits are established:—first a circuit from the positive pole of the source through springs 3 and 4 and lamp $Lb1$ to the negative pole of the source; second a circuit from the positive pole of the battery through springs 3, 4, 5 to line $Ab$ which proceeds to the respective section indicators N, and at each indicator through the visual signal $LAb$ to the negative pole of the source. In all, therefore, three classes of signals are given; an audible signal common to the whole group and to all classes of servants, visual signals distinctive of the section to which the calling station belongs and of the class of servants called, and a visual signal distinctive of the calling station and of the class of servant called. The attendants hearing the audible signal look at the indicator nearest them and can see at once whether it is an attendant of their class that is wanted. If it is, they can see also the section to which they have to go. Arriving at the section they will be within sight of the visual signal over the door of the room calling. As the attendant enters the door he will depress the button 22 appropriated to him, so releasing the armature 2. This armature is returned to its normal position by the spring 3 and the springs 3, 4, 5 separate so breaking the circuits of the visual signals. The audible signals are so disposed throughout the group that one or other of them will certainly be heard by the staff. The section indicators are so disposed that one of them is always within easy access of an attendant anywhere in the group so that it can be inspected immediately the audible signal is heard; for instance one such section indicator will be provided in the room assigned to each class of servants, and another, for reasons hereinafter appearing, will be arranged at the head of the stairs leading from the floor which constitutes the group to the floor below, or at the foot of the stairs leading to the floor above. In an indicator for a servant's room it is not strictly necessary to have any other visual signals than those for the class of servants to which the room is assigned. In the present instance such a servant's indicator will consist of one row only of the visual signals shown in the indicator of Fig. 5. The connections to such an indicator are sufficiently indicated by the six-wire cables $Sb$, $Sc$, which are tapped off from the main cable I and which lead respectively to the indicators in the servants' rooms of class $b$ and class $c$ respectively. It is assumed that the third class of servants in this case is expected to exercise supervision over the other classes, and for this reason the indicators assigned to this third class contain all the visual signals.

If desired the audible signal may be made distinctive of the class of servants, for instance by the use of bells of different tone. In that case, as shown in Fig. 3ª, the windings of electromagnets R$a$1, R$b$1, R$c$1, instead of being connected to a common line $y$ would be connected to three different lines, $ya$, $yb$, $yc$, each provided with its own relays $ra$, $rb$, $rc$ and bells W$a$, W$b$, W$c$ connected by lines $wa$, $wb$, $wc$. Also there need not be the same number of kinds of audible signal as of visual signal when there is a plurality of both kinds; for instance there might be two differently toned bells, one distinctive of one class of servants and the other common to the remaining two classes.

It sometimes happens in institutions of the kind contemplated that the attendants of one group are required to serve another group in addition to their own. This requirement may extend to the servants of all classes or to the servants of one or two classes only. For instance in a hotel at one time of day the waiters of the fourth floor may be required to attend to calls for waiters from the fifth floor, while at another time of day the maids of the fourth floor may serve the fifth floor also. The part of the system about to be described effects the transference of signals necessary to such a transference of services. Taking as an example the case of servants on the fourth floor serving the fifth floor also, it will be obvious that while on the fourth floor it is of no interest to them to know which section of the fifth floor is calling. They will be interested to know which class of servants is called so that there may be no unnecessary running upstairs. But it is sufficient for them to find out on reaching the fifth floor which section they have to go to, and that they can do by inspecting the section indicator to be found at the head of the stairs. Further any one class of servants is not interested in the calls for any other class. Hence all necessary indications can be provided for by the addition to each servant's indicator of one visual signal for each of the groups besides its own to which that class of servants may be required to attend.

A servant's indicator is shown in Fig. 6. This is assumed to be for the supervising class of servants and therefore corresponds in its upper part exactly with the section indicator. The whole institution is assumed to comprise five groups of stations. Therefore at the bottom of the indicator there are added four visual signals each corresponding with one of the remaining groups. The indicator is assumed to belong to group III and therefore the visual signals are assigned respectively to groups I, II, IV and V. As they are all for one class of servants their nature will be sufficiently indicated by the references LI$a$, LII$a$, LIV$a$, LV$a$. The electrical connections of the upper part of the indicator of Fig. 6 are sufficiently shown in Fig. 5. The connections for the lower portion are shown in part in Fig. 5 and more fully in Fig. 7, where it will be seen that one terminal of each of the visual indicators or lamps LI$a$, etc., is joined to the negative pole of the source, while the other terminals are joined to individual lines which are united with a wire $wTa$ from the bell WT$a$ of Fig. 5 into a five-wire cable carried down to a transfer board common to the whole system and shown in Fig. 9. Bells such as WT$a$, of different tone from the bells W are installed in the servery for each class of servants, and a five-wire cable runs from each servery to the transfer board.

There being, say, three sections, and three classes of servants in a given group it will be apparent that nine different kinds of calls may be given. These have to be transferred to another group as three kinds of calls only, corresponding to the three classes of servants. To effect the necessary assembling of the calls a ten-wire cable is tapped from the main cable of the group and carried to a transfer cabinet in the group which contains ten relays the connections of which are indicated on Fig. 8. This ten-wire transfer cable is shown at TI in Fig. 5, and TI in Fig. 8 may be supposed to illustrate the distant end of the same cable. From Fig. 8 it will be seen that the bell wire $w$ forming one wire of this cable is connected through a bell transfer relay T$r$ to the positive pole of the source. Each of the wires A$a$, A$b$, A$c$, B$a$, B$b$, etc., is connected through a transfer relay $r$A$a$, $r$A$b$, etc., to the negative pole of the source. The relay T$r$ has an armature 30 connected to the negative pole of the source through a suitable protecting fuse 31, and its armature when attracted abuts upon a contact 32 joined to one spring of a number of jacks J$a$I, J$b$I, J$c$I arranged upon the transfer board shown in Fig. 9. Each of the relays RA$a$, etc., has an armature 33 joined to a second spring in one of the jacks. The armatures 33 of all the relays $r$A$a$, $r$B$a$, and $r$C$a$ are joined to the second spring of jack J$a$I; the armatures of all relays $r$A$b$, $r$B$b$, etc., are joined to jack J$b$I and so on, as may be clearly seen from Fig. 8. Each of the armatures 33 when attracted abuts upon a contact 34, all of which contacts are joined through a suitable protecting fuse 35 to the positive pole of the source.

The transfer board of Fig. 9 resembles the switch board of an ordinary telephone system. At the bottom of this board there are in the case illustrated fifteen jacks including and corresponding with those shown in Fig. 8, there being three jacks appropriated to the three different classes of servants for each of the supposed five groups. Above these transfer jacks are five rows of jacks each appropriated to one group. In each row there are twelve jacks comprising three jacks for each of the groups other than that to which the particular row is appropriated. They may conveniently be characterized according to the class of servant to which they are appropriated, and the groups between which a transference of service is made. Thus, for instance, a jack I$a$II is in use when the calls of group II for servants of class $a$ are to be answered by the servants of group I; similarly the jack III$b$V is in use when the calls of group V for servants of class $b$ are to be transferred to and answered by servants of group III. The connections of these upper jacks appear in Fig. 7 which shows the four jacks of groups III appropriated to the servants of class $a$. One spring of each jack is joined to the wire tapped from the bell line $wTa$ of group III. The other spring of each jack is joined to the respective visual signal, that of jack III$a$I to visual signal LI$a$ and so on. In use a transference is effected by connecting one of the jacks J$a$I, etc., to one of the jacks I$a$II, etc., by means of ordinary cord connectors 36. Two such connectors are shown in use in Fig. 9. One of these connects jack J$b$II with jack III$b$II the effect of which is that calls from group II for servants of class $b$ are received and attended to by the servants of group III. The other connects jack J$c$V with jack IV$c$V, with the result that calls from group V for servants of class $c$ are received and attended to by the servants of group IV. Supposing that with these connections made a station in group II calls for a servant of class $b$, the events which will occur and the signals which will be given in the apparatus of group II are exactly the same as though no connection had been made by means of the cord connector 36 and therefore exactly correspond with the description of the effect of the call above given. But in addition to the visual and audible signals in the group being actuated, the following events will occur: As has been seen from Figs. 3, 4 and 5, the effect of any call in a group is to connect the line $w$ of that group through contact 8 and armature 7 to the negative pole of the source. Hence referring to Fig. 8 there will be a circuit from the positive pole of the source through the winding of relay T$r$ to this line $w$, and hence to the negative pole. Consequently armature 30 is attracted and abuts upon contact 32. This produces a circuit illustrated in part in Fig. 5 or 7, in part in Fig. 8, and in part in Fig. 9, viz. as follows:—(Fig. 5 or 7) from the positive pole of the source, through bell WT$b$ of the servery of class $b$ in group III to line $wTb$ of group III, and hence to the long spring of jack III$b$II (Fig. 8), through one wire of the cord connector 36 to the long spring of jack J$b$II, and through contact 32 and armature 30 (Fig. 8) to the negative pole of the source. The consequence is that bell WT$b$ is rung, that is to say a call from group II has produced an audible signal in $b$ servery of group III. It may further be seen from Fig. 3 that another effect of a call for a servant of class $b$ is to connect the positive pole of the source through contacts 3, 4, 5 to a line such as A$b$. A tapping from this line appears in Fig. 8 from which it may be seen that the circuit is continued through the winding of relay $rAb$ to the negative pole of the source. Hence relay $rAb$ attracts its armature 33 which abuts upon the contact 34. By this means a further circuit is produced which extends over Figs. 7, 8 and 9 and this is as follows:—(Fig. 8) from the positive pole of the source through contact 34, armature 33 to the short spring of jack J$b$II; thence through the cord connector 36 (Fig. 9) to the short spring of jack III$b$II and so through the visual signal LII$b$ of group III (Fig. 7) to the negative pole of the source. Thus a call from group II for a servant of class $b$ has produced a visual signal in the indicator of group III appropriated to that class. The attendants hearing the audible signal can see by a glance at their indicators from which group it comes. Arriving at the head or the foot of the stairs leading to that group they find an indicator which shows them the section in which the calling station is situated.

It will be obvious that the details of any particular signaling system can readily be modified to suit the particular circumstances of the institution to be served. As an example of the modifications may be instanced a large hotel in which the fifth and sixth floors are treated as a single group of stations with respect to all classes of servants. With respect to a particular class the group may be still further extended. For instance the waiters of the fourth floor may serve the fifth and sixth floors also although those floors have independent maid and valet services. For such coditions it is convenient to employ two audible signals, one distinctive of waiters, and the other serving in common for maids and valets. The waiters' audible signal line should then be permanently connected, independently of the transfer board, to audible signals on the fourth floor.

In some cases where during times of pressure the whole of the attendance staff may be occupied and away from the servery it may be desirable to know where a servant can be found. For instance on board ship there will be times when the services of the steward or stewardess attached to a particular group of cabins will be very much in demand, and if they are not in their servery it may be important to know where they are. A scheme meeting this requirement is shown in Fig. 10, which in its main outlines is analogous to Fig. 3 save that it is designed for two classes of servants only, and will be understood from the description of Fig. 3 by the aid of the corresponding references. But in addition to the parts of Fig. 3 it will be seen that the contact apparatus of the station shown in Fig. 10 has a pair of contact springs 40 which are in the circuit of an additional lamp or other signal $Z^1$, placed upon an indicator in the servery or other suitable position. There will be a lamp $Z^1$, $Z^2$, etc., for each station served. The contact 40 is preferably operated by means of a key inserted in a socket 41 in the contact making apparatus. With this scheme when an attendant answers a call he not only releases, as before, the signals that have been given, but also operates the additional signal $Z^1$, etc., so as to show at the servery that he is for the moment engaged in station or cabin 1. On leaving the station he gives the key a further turn so that the contacts 40 separate and the additional signal is extinguished. Obviously the key or other device used to operate the contacts 40 may be the same device as releases the signals previously given.

What we claim is:

1. An attendant's signaling system comprising a plurality of groups of stations with a calling device at each station, signaling devices appropriated to respective groups, signaling devices in respective groups indicative of each of the other groups, connections between said first-named signaling devices and the calling devices of their respective groups, and means for connecting the calling devices of one group to the signaling devices of another.

2. An attendant's signaling system comprising a plurality of groups of stations each with a calling device, signaling devices appropriated to respective groups, connections between said signaling devices and the calling devices of their respective groups, and means for connecting the calling devices of one group to the signaling devices of another group without interfering with the operation of the signaling devices of the first-named group.

3. An attendant's signaling system comprising a plurality of groups of stations with a plurality of calling devices at each station distinctive of different classes of attendants, signaling devices distinctive of the classes of attendants located in respective groups, and means for connecting the calling device of a particular class and group to the signaling devices of that class in any other group.

4. An attendant's signaling system comprising a plurality of groups of stations each with a calling device, signaling apparatus located in the respective groups, further signaling apparatus located in the respective groups and indicative of each of the other groups, and means for connecting the calling devices of one group to said further signaling apparatus located in another.

5. In an attendant's signaling system the combination with a plurality of self-contained signaling groups, each having a plurality of distinctive calling devices at each of a plurality of stations and signaling apparatus comprising distinctive signaling devices operable from respective calling devices, of a transfer board, connections between said board and the distinctive calling devices of each group, and between said board and distinctive signaling devices at each group, and means for joining at the board a particular class of calling devices of any group to the corresponding class of signaling devices at another group.

6. In a signaling system the combination with a plurality of self-contained signaling groups, each comprising means for giving a plurality of distinctive signals, of means for assembling the signals of any group and reducing them to fewer distinctive kinds, means in each group for indicating such reduced number of distinctive signals, and means for connecting the assembling and reducing apparatus of any group to the indicating apparatus of another.

7. In a signaling system the combination with a plurality of distinctive indicating devices, of calling devices, electrical connections between said calling devices and respective signaling devices, of a plurality of electromagnetic devices each electrically connected in circuit with one indicating device, and a common indicating device controlled by each of said electromagnetic devices.

8. In a signaling system the combination with a group of stations having calling devices of a common indicator, signals on said indicator operable by said calling devices, further signals on said indicator distinctive of respective stations, and means at the stations for operating said further signals and releasing the calling signals.

9. In an attendant's signaling system, the combination of visual signals adjacent to the station distinctive of different classes of attendants, a remote indicator having visual signals similarly distinctive, relays at each station corresponding in number to the number of distinctive signals, calling devices controlling said relays, contacts operated by said relays controlling said signals, means for automatically retaining the armature of the relay mechanically when attracted, and means for releasing said armatures.

10. In an attendant's signaling system the combination with a group of stations of a plurality of indicators distributed through said group, visual signals upon said indicators distinctive of a section of the group, relays at the stations, calling devices controlling said relays, contacts actuated by said relays controlling said signals, means for automatically holding up the armatures of said relays when attracted, and means for releasing said armatures.

11. An attendant's signaling system comprising a plurality of groups of stations, means at each station for simultaneously actuating a signal peculiar to the station and one common to the group, and means for transferring the common signals of any one group to the attendants of any other.

12. In an attendant's signaling system the combination with a plurality of self-calling devices at a plurality of stations and signaling apparatus operable from the calling devices of the group, and also having calling devices distinctive of the remaining groups of a transfer board, connections between said transfer board and the calling devices and of the signaling apparatus in each group distinctive of each of the other groups, and means for joining at the board the calling devices of one group to the signaling apparatus at another group distinctive of said first-named group.

13. An attendant's signaling system comprising a plurality of groups of stations with a calling device at each station, signaling apparatus located in the respective groups and distinctive of each of the other groups, and means for connecting the calling devices of one group to the signaling apparatus distinctive of that group located in another group.

In testimony whereof we have signed our names to this specification each in the presence of two subscribing witnesses.

FREDERICK BRINKMANN.

Witnesses:
  A. MILLER,
  JULIUS RÖFKE.

FRANCIS GEORGE BELL.

Witnesses:
  A. E. O'DELL,
  LEONARD E. HAYNES.